Patented Aug. 30, 1949

2,480,269

UNITED STATES PATENT OFFICE 2,480,269

PROCESS OF REACTING A NITRO-HYDROXY-ANTHRAQUINONE WITH A PRIMARY AMINE AND A PRODUCT THEREOF

George W. Seymour and Victor S. Salvin, Cumberland, Md., assignors to Celanese Corporation of America, a corporation of Delaware No Drawing. Application December 21, 1946, Serial No. 717,804

11 Claims. (Cl. 260—379)

This invention relates to anthraquinone dyestuffs and relates more particularly to improved anthraquinone dyestuffs for dyeing cellulose acetate or other organic derivative of cellulose textile materials in valuable blue and blue-violet shades.

An object of this invention is the production of novel anthraquinone dyestuffs having an excellent degree of affinity for cellulose acetate or other organic derivative of cellulose textile materials and dyeing the said textile materials in level blue and blue-violet shades fast to light and which, in addition, possess an unusual degree of resistance to acid fading.

Other objects of this invention will appear from the following detailed description.

While the commercially available anthraquinone dyestuffs having a satisfactory degree of affinity for cellulose acetate or other organic derivative of cellulose textile materials and dyeing said materials in desirable blue shades are noted for their excellent fastness to light, they are limited in value due to their generally poor resistance to acid fading. On prolonged exposure to acid fumes these dyestuffs are usually found to change appreciably in shade and, depending upon the particular dyestuff, may fade from a blue shade to a reddish-blue or even a pink color. Heretofore, a great deal of sustained research has gone into the development of anthraquinone dyestuffs which dye cellulose acetate or other organic derivative of cellulose textile materials in blue shades which are not only fast to light but which are also highly resistant to acid fading, without appreciable success.

We have now found that novel anthraquinone dyestuffs having an excellent degree of affinity for cellulose acetate or other organic derivative of cellulose materials and dyeing said materials in desirable blue shades fast to light which are also extraordinarily resistant to acid fading may be obtained by condensing a hydroxy-substituted anthraquinone compound containing a plurality of nitro groups, at least one of which is in para-position to a hydroxy group, with a primary organic amine at a relatively low temperature, i. e. from about 100° to 130° C., in the presence of water. By effecting the condensation at a relatively low temperature in the presence of water, the reaction which takes place may be controlled so that only one of the nitro groups present on the anthraquinone nucleus will react with the primary amine employed and be replaced thereby. The use of higher temperatures and anhydrous conditions in effecting said condensation yields anthraquinone reaction products in which more than one of the nitro groups is replaced, thus forming a polyamino compound. The polyamino compounds are quite unsatisfactory when employed for dyeing cellulose acetate or other organic derivative of cellulose materials.

The valuable dyestuffs of our invention may be obtained by reacting hydroxy-substituted polynitro-anthraquinone compounds such as, for example, 4,8-dinitro-anthrarufin, 4,8-dinitro-anthrachrysone, 4,5-dinitro-chrysazin, 1,6-dihydroxy-4,5-dinitro-anthraquinone, 1,7-dihydroxy-4,5-dinitro-anthraquinone etc., with a primary organic amine which may be an aliphatic, cycloaliphatic, heterocyclic or, most advantageously, a primary aromatic amine. Examples of the amines which may be employed in accordance with the novel process of our invention are methylamine, ethylamine, propylamine, butylamine, ethanolamine, butanolamine, 3-amino-4-heptanol, tris-hydroxymethyl-amino-methane, cyclohexyl-amine, benzylamine, amino-pyridine, amino-quinoline, aniline, toluidine, amino-ethyl benzene, amino-acetophenone, amino-cresol, amino-phenol, sulfanilamide, p-amino-benzamide, p-amino-benzoic acid and esters thereof, p-anisidine, p-phenetidine, 2,5-dimethoxy aniline, p-phenylene diamine and naphthylamine.

The primary organic amines and nitro-anthraquinone compounds are preferably reacted in such molecular ratio that the number of amino groups in the reaction mixture are in excess of the number of nitro groups on the anthraquinone compound condensed therewith. Preferably, a ratio of from 5 to 10 or even 15 mols of the primary amine are employed in the condensation reaction for each mol of the nitro-anthraquinone compound condensed therewith. The condensation reaction is preferably carried out under reflux for about 2 to 4 hours, when the reaction mixture becomes greenish-blue indicating a complete or substantially complete condensation.

We have also found that the use of reaction temperatures of 100 to 130° C. with water present in the reaction medium is highly advantageous when condensing a hydroxy-substituted nitroanthraquinone containing but one nitro group, such as 4-nitro-alizarin, 4-nitro-anthragallol or 1-hydroxy-4-nitro-anthraquinone, with a primary amine such as those indicated above. Under these conditions, side reactions such as the formation of azoxy compounds or the reduction of the nitro group to an amine group are minimized. The major product obtained is that formed by replacement of the nitro group by the primary amine, yielding a substituted-amino-hydroxy-anthraquinone.

In order further to illustrate our invention, but without being limited thereto, the following examples are given:

Example I 10 parts by weight of 4,8-dinitro-anthrarufin (.03 mol) are dissolved in 41 parts by weight of aniline (.45 mol) containing 1.6 parts by weight of water. The reaction mixture is heated to 120° C. under reflux with stirring. As the condensation reaction proceeds, nitrogen is evolved and further water is formed. After 2 hours, the reaction mixture turns greenish-blue. The condensation reaction is continued under reflux for 2 hours longer. The melt obtained is then poured into about 120 parts by weight of ethyl alcohol and the dyestuff which has formed precipitates as a pasty solid. 84 parts by weight of 18% hydrochloric acid are then added to form the soluble aniline hydrochloride and to solubilize certain yellow impurities which are present. The cooled aqueous alcohol suspension is then filtered, the filtrate containing the aniline and the alcohol-soluble impurities. The dyestuff press-cake is washed with dilute (18%) hydrochloric acid and then resludged in 70% alcohol to effect further removal of undesired impurities. The dyestuff obtained after filtration is a dark blue solid comprising 4-nitro-8-anilido-anthrarufin. The dyestuff dyes cellulose acetate materials in a neutral blue shade of an excellent fastness to light having a resistance to acid fading of 5 A. A. T. C. C. units, which is practically equivalent to a complete immunity to acid fading.

Example II 10 parts by weight of 4,8-dinitro-anthrarufin are dissolved in 50 parts by weight of p-sulfanilamide containing 1.6 parts of water by weight. The reaction mixture is heated to 125° C. under reflux with stirring. As the condensation proceeds further water is formed and gaseous nitrogen is evolved. At the end of 4 hours, the reaction mixture turns greenish-blue. The melt obtained is poured into 200 parts of ethyl alcohol. The precipitated solid is filtered off and resludged in 100 parts of 18% hydrochloric acid to solubilize excess p-sulfanilamide and yellow impurities. The dyestuff obtained after filtration is a reddish-blue solid comprising 4-nitro-8-(p-sulfanilamido)-anthrarufin. The dyestuff dyes cellulose acetate materials in a neutral blue shade of excellent light fastness to light having a resistance to acid fading of 5 A. A. T. C. C. units.

Example III 10 parts by weight of 4,8-dinitro-anthrarufin are dissolved in 45 parts by weight of p-toluidine containing 1.6 parts of water by weight. The reaction mixture is heated at 105° C. for 3 hours under reflux. The melt is poured slowly into a stirred mixture of 50 parts by weight of alcohol and 100 parts by weight of 18% hydrochloric acid maintained at 25° C. The precipitated solid is filtered off and washed with 100 parts of 18% hydrochloric acid and then with water. The blue solid, comprising 4-nitro-8-toluidino-anthrarufin, dyes cellulose acetate materials in a neutral blue shade of excellent light fastness and of acid fading resistance equivalent to 5 A. A. T. C. C. units.

Example IV 10 parts by weight of 4,5-dinitro-chysazin are dissolved in 50 parts by weight of tris-hydroxy-methyl-amino-methane, $(CH_2OH)_3-C-NH_2$, containing 1.6 parts of water by weight. The reaction mixture is heated to 120° C. under reflux with stirring. At the end of four hours, the reaction mixture turns greenish-blue. The melt is poured into a mixture of 200 parts of ethyl alcohol and 100 parts of water. The precipitated solid is filtered and washed with dilute hydrochloric acid and then with water. The dark blue solid dyestuff obtained, comprising 4-nitro-5-(tris-hydroxymethyl)-methylamino-chrysazin, dyes cellulose acetate materials in neutral blue shades of excellent light fastness and resistance to acid fading.

It is to be understood that the foregoing detailed description is given merely by way of illustration and that many variations may be made therein without departing from the spirit of our invention.

Having described our invention, what we desire to secure by Letters Patent is:

1. Process for the production of improved anthraquinone dyestuffs, which comprises condensing a hydroxy-substituted nitro-anthraquinone free of other functional groups with an organic primary amine by reacting a mixture consisting of a hydroxy-substituted nitro-anthraquinone, an organic primary amine and a substantial quantity of water at a temperature of from about 100 to 130° C.

2. Process for the production of improved anthraquinone dyestuffs, which comprises condensing a hydroxy-substituted nitro-anthraquinone free of other functional groups with an aliphatic primary amine by reacting a mixture consisting of a hydroxy-substituted nitro-anthraquinone, an organic primary amine and a substantial quantity of water at a temperature of from about 100 to 130° C.

3. Process for the production of improved anthraquinone dyestuffs, which comprises condensing a hydroxy-substituted nitro-anthraquinone free of other functional groups with an aromatic primary amine by reacting a mixture consisting of a hydroxy-substituted nitro-anthraquinone, an organic primary amine and a substantial quantity of water at a temperature of from about 100 to 130° C.

4. Process for the production of improved anthraquinone dyestuffs, which comprises condensing a hydroxy-substituted polynitro-anthraquinone having at least one nitro group in para-position to a hydroxy group and free of other functional groups with an organic primary amine by reacting a mixture consisting of a hydroxy-substituted polynitro-anthraquinone, an organic primary amine and a substantial quantity of water at a temperature of from about 100 to 130° C.

5. Process for the production of improved anthraquinone dyestuffs, which comprises condensing a hydroxy-substituted polynitro-anthraquinone having at least one nitro group in para-position to a hydroxy group and free of other functional groups with an aliphatic primary amine by reacting a mixture consisting of a hydroxy-substituted polynitro-anthraquinone, an organic primary amine and a substantial quantity of water at a temperature of from about 100 to 130° C.

6. Process for the production of improved anthraquinone dyestuffs, which comprises condensing a polyhydroxy-substituted polynitro-anthraquinone having at least one nitro group in para-position to a hydroxy group and free of other functional groups with an organic primary amine by reacting a mixture consisting of a hydroxy-substituted polynitro-anthraquinone, an organic primary amine and a substantial quantity of water at a temperature of from about 100 to 130° C.

7. Process for the production of improved anthraquinone dyestuffs, which comprises condensing 4,8-dinitro-anthrarufin with an organic primary amine by reacting a mixture consisting of 4,8-dinitro-anthrarufin, an organic primary amine and a substantial quantity of water at a temperature of from about 100 to 130° C.

8. Process for the production of an improved anthraquinone dyestuff, which comprises condensing 4,8-dinitro-anthrarufin with aniline by reacting a mixture consisting of 4,8-dinitro-anthrarufin, aniline and a substantial quantity of water at a temperature of from about 110 to 130° C.

9. Process for the production of an improved anthraquinone dyestuff, which comprises condensing 4,8-dinitro-anthrarufin with para-toluidine by reacting a mixture consisting of 4,8-dinitro-anthrarufin, para-toluidine and a substantial quantity of water at a temperature of from about 110 to 130° C.

10. Process for the production of an improved anthraquinone dyestuff, which comprises condensing 4,5-dinitrochrysazin with tris-hydroxymethyl-amino-methane by reacting a mixture consisting of 4,5-dinitro-chrysazin, tris-hydroxymethyl-amino-methane and a substantial quantity of water at a temperature of from about 110 to 130° C.

11. The anthraquinone dyestuff 4-nitro-5-(tris-hydroxymethyl)-methylamino-chrysazin.

GEORGE W. SEYMOUR.
VICTOR S. SALVIN.

REFERENCES CITED

The following references are of record in the file of this patent:

UNITED STATES PATENTS

| Number | Name | Date |
|---|---|---|
| 2,053,274 | Ellis et al. | Sept. 8, 1936 |
| 2,068,371 | Buxbaum | Jan. 19, 1937 |

FOREIGN PATENTS

| Number | Country | Date |
|---|---|---|
| 9,506 | Great Britain | 1898 |